3,101,377
SULFONE DERIVATIVES OF MERCAPTO-
HALOETHYLENE
Henry Bluestone, University Heights, and Russell M. Bimber, Painesville, Ohio, assignors to Diamond Alkali Company, Cleveland, Ohio, a corporation of Delaware
No Drawing. Filed Oct. 6, 1958, Ser. No. 765,329
12 Claims. (Cl. 260—607)

The present invention relates to novel aliphatic sulfoxide and sulfone derivatives of tetrahaloethylenes and to their preparation and application.

The compositions of this invention comprise compounds of the structure (I) 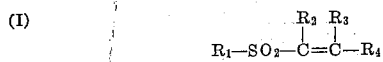

wherein $R_1$ is selected from the group consisting of alkyl radicals, e.g., preferably those having from 1 to 10 carbon atoms, inclusive, such as methyl, ethyl, propyl, isopropyl, butyl, hexyl, and octyl radicals and their isomers; hydroxyalkyl radicals, such as hydroxyethyl, hydroxypropyl, hydroxybutyl, and hydroxyoctyl radicals; alkoxyalkyl, e.g., methoxy, ethoxy, propyloxy, butyloxy, and octyloxyalkyl radicals; haloalkyl radicals, e.g., bromoalkyl and chloroalkyl radicals, such as bromopropyl, bromoethyl, bromobutyl, chloromethyl, chloropropyl, chloroisopropyl, chloroethyl, chlorooctyl, dichlorooctyl, and iodoethyl; $R_2$, $R_3$, and $R_4$ are selected from the group consisting of halogen atoms, i.e., fluorine, chlorine, bromine, and iodine; alkylsulfonyl radicals of the structure $R_1$—$SO_2$—, and alkylthio radicals of the structure $R_1$—S—, wherein $R_1$ is as previously defined.

Whenever the respective sulfone compounds of Structure I above are referred to in the specification and claims, this structure or chemical term is also intended to include the intermediate sulfoxide derivatives, i.e., $R_1$—SO— wherein $R_1$ is as defined above.

Preferred illustrative compounds within the scope of this invention are sulfone compounds of Structure I above, wherein $R_4$ is an alkylsulfonyl radical, represented by the structure (II)  $R_1$—$SO_2$—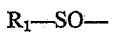—$SO_2$—$R_5$ wherein $R_1$, $R_2$, and $R_3$ are as previously defined, $R_5$ being selected from the group consisting of alkyl radicals, preferably lower alkyl radicals, i.e., those having from 1 to 10 carbon atoms, alkoxyalkyl, hydroxyalkyl, and haloalkyl radicals as previously defined.

Specific and illustrative compounds within the scope of the present invention are alkylsulfonyl ethylene derivatives, including 1,2-dichloro-1,2-bis(methylsulfonyl)ethylene
1,2-dichloro-1,2-bis(ethylsulfonyl)ethylene
1,2-dichloro-1,2-bis(isopropylsulfonyl)ethylene
1,2-dibromo-1,2-bis(isopropylsulfonyl)ethylene
1,2-dichloro-1,2-bis(n-butylsulfonyl)ethylene
1,2-dichloro-1,2-bis(n-octylsulfonyl)ethylene Still other specific compounds of this invention are substituted alkylsulfonyl ethylenes such as 1,1,2-trichloro-2-(2-chloroethylsulfonyl)ethylene
1,2-dichloro-1,2-bis-(2-hydroxyethylsulfonyl)ethylene
1,2-dichloro-1,2-bis-(2-chloroethylsulfonyl)ethylene
1-chloro-1,2,2-tris-(2-hydroxyethylsulfonyl)ethylene
Tetrakis(2-chloroethylsulfonyl)ethylene
1,1,2-trichloro-2-(2-bromobutyl)ethylene
1,2-dichloro-1,2-bis-(2-bromobutyl)ethylene Illustrative sulfoxide intermediates of the above specific compounds are 1,2-dichloro-1-ethylthio-2-ethylsulfinylethylene
1,2-dichloro-1,2-bis-(ethylsulfinyl)ethylene
1,2-dichloro-1-ethylsulfinyl-2-ethylsulfonylethylene
1-chloro-1,2,2-tris-(2-hydroxyethylsulfinyl)ethylene
1-chloro-2-(2-hydroxyethylsulfinyl)-1,2-bis-(2-hydroxyethylsulfonyl)ethylene Compounds within the scope of generic Structure I may be prepared by chemically reacting a "thio compound," which term hereinafter refers to a compound of the structure (III) 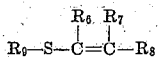
$R_9$—S—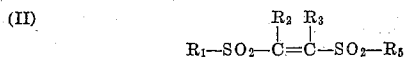—$R_8$ wherein $R_9$ is selected from the group consisting of alkyl, hydroxyalkyl, alkoxyalkyl, and haloalkyl radicals as previously defined; $R_6$, $R_7$, and $R_8$ are selected from the group consisting of halogen atoms, alkylsulfonyl radicals of the structure $R_9$—$SO_2$—, and alkylthio radicals of the structure $R_9$—S—, wherein $R_9$ is as previously defined, with an oxidizing agent. Suitable oxidizing agents are hydrogen peroxide, potassium permanganate, potassium dichromate, chromic acid and organic peracids, such as performic, peracetic, and perbenzoic acids. This oxidation may be carried out either after isolation of the thio compound from its initial reaction mixture or by oxidation of the thio compound in crude form.

The thio compound and oxidizing agent are generally mixed in about stoichiometric amounts typically employing about a 10% to 20% excess of the oxidizing agent. The oxidation occurs during a period greater than about ¼ hour, e.g., ¼ to 150 hours, typically in a period of less than 72 hours at a temperature of about —20° to 150° C., e.g., at a temperature within the range from about 20° to 90° C.

A solvent which should be inert to the oxidizing agent employed is normally required to facilitate the oxidation; suitable solvents are carboxylic acids, such as formic or acetic acid, preferably acetic acid; alcohols, such as ethanol, methanol, and isopropanol; hydrocarbons, such as petroleum ether, benzene, toluene, xylene; ethers, such as dioxane, diethyl ether, and tetrahydrofuran; and chlorinated hydrocarbons, such as chloroform, chlorobenzene, chloroethylene, e.g., tetrachloroethylene or trichloroethylene and carbon tetrachloride.

The resultant sulfoxides and sulfones of this invention typically are solids; therefore, isolation of the product normally is carried out through recrystallization from an organic solvent, typically acetic acid, an alcohol, such as ethanol or isopropanol, and mixtures of these with water.

More specifically, compounds within the scope of Structure II may be prepared by chemically reacting a compound of Structure III, wherein $R_8$ is selected from the group consisting of alkylsulfonyl radicals of the structure $R_9$—$SO_2$— and alkylthio radicals of the structure $R_9$—S—, wherein $R_9$ is as previously defined, with an oxidizing agent, preferably hydrogen peroxide. This oxidation is carried out under essentially the same reaction conditions as that taught previously concerning the oxidation of a compound of Structure III, i.e., thio ethers to sulfones. That is, the reaction is typically carried out at a temperature of about —20° to 90° C. over a period of about ¼ to 150 hours in the presence of a solvent, preferably acetic acid. The reactants are typically combined in essentially stoichiometric amounts and the resultant sulfone may be isolated by recrystallization from an organic solvent, such as acetic acid, methanol, propanol, butanol, isopropanol, and mixtures of water with acetic acid, methanol, propanol, butanol, and isopropanol.

Illustrative of ethylene compounds which may be oxidized to their respective sulfone or sulfoxide derivatives in accordance with this invention are 1,2-dichloro-1,2-bis-(ethylthio)ethylene
Tetrakis(ethylthio)ethylene
Tetrakis(2-chloroethylthio)ethylene
1-chloro-1,2,2-tris(isopropylthio)ethylene
1,2-dichloro-1,2-trans-bis-(2-propylthio)ethylene
1,2-dichloro-1,2-cis-bis-(2-propylthio)ethylene
1,2-dichloro-1,2-bis(chloropropylthio)ethylene The compounds of this invention may be employed in a variety of applications, biological or otherwise, but are specifically useful in the fields of petsicides, being active fungicides, i.e., foliage protectant materials and soil treating agents, insecticides, nematocides, and herbicides. It is significant to note that the sulfone compounds of this invention, i.e., those within the scope of generic Structure I above, are active both as contact fungicides, i.e., the fungus is contacted with the fungicide of compound I and as systemic fungicides, i.e., the soil or locus around the infested plants is contacted with the fungicide thus immunizing the plant from infestation by fungi, such as blight fungi.

It will be understood, of course, that such compounds may be used in diverse formulations, both liquid and solid, including finely-divided powders, dusts and granular materials, solutions, concentrates, emulsifiable concentrates, slurries, and the like, depending upon the application intended and the formulation media desired.

Thus, it will be appreciated taht compounds of this invention may be employed to form biologically-active substances containing such compounds as essential active ingredients thereof, which compositions may also include finely-divided dry or liquid carriers, extenders, fillers, conditioners, including various clays, diatomaceous earth, talc, spent catalyst, alumina-silica materials and incorporating liquids, solvents, diluents, etc., typically water and various organic liquids, such as alcohols, e.g., isopropanol, ethanol, methanol; hydrocarbons, e.g., benzene, toluene, xylene; chlorinated hydrocarbons, such as tetrachloroethylene, trichlorobenzene, chlorinated xylene, chloroform, carbon tetrachloride; and petroleum distillate fractions or mixtures thereof.

When liquid formulations are employed or dry materials prepared which are to be used in liquid form, it is desirable in certain instances additionally to employ a wetting, emulsifying or dispersing agent to facilitate use of the formulation. Suitable surface active agents being set out for example in an article by John W. McCutcheon in Soap and Chemical Specialties, vol. 31, Nos. 7 through 10 (1955).

The term "carrier" as employed in the specification and claims is intended to refer broadly to the materials constituting a major proportion of a biologically-active or other formulation and hence includes finely-divided materials, both liquids and solids, as aforementioned conventionally used in such applications.

The compounds of the present invention may be used alone or in combination with other known biologically-active or other materials, such as chlorinated hydrocarbons and organic phosphorous compounds, foliage and soil pesticides and fungicides, pre- and post-emergent herbicides, nematocides, and the like.

In order that those skilled in the art may more completely understand the present invention, the following specific examples are offered:

EXAMPLE I

*Preparation of Trans-1,2-Dichloro-1,2-Bis(Isopropylthio)Ethylene*

500 ml. of isopropanol is added to 56.1 g. of potassium hydroxide in a flask equipped with stirrer, thermometer, and reflux condenser. 76.0 g. of 2-propanethiol is then added to the mixture and finally 41.5 g. of perchloroethylene is added. The mixture is heated to reflux, i.e., about 84° C., and allowed to reflux with stirring for four days. Upon completion of reaction, the products include 1,2-dichloro-1,2-trans-bis-(2-propylthio)ethylene 1,2-dichloro-1,2-cis-bis-(2-propylthio)ethylene, and 1-chloro-1,2,2-tris-(2-propylthio)ethylene. The dichloro-dithio-compound, $C_8H_{14}Cl_2S_2$, is isolated by recrystallization from isopropanol. The resultant product has a melting point of 33.5°–35.0° C.

The following analytical data confirms the identity of the product as $C_8H_{14}Cl_2S_2$:

| Element | Actual, Percent By Wt. | Calculated, Percent By Wt. |
|---|---|---|
| C | 39.1 | 39.2 |
| H | 5.7 | 5.8 |
| S | 26.0 | 26.2 |

The product is soluble to the extent of less than 5 g. per 100 ml. of water and more than 5 g. per 100 ml. of acetone, cyclohexanone, and xylene at 25° C.

EXAMPLE II

In order to evaluate fungicidal activity, spore germination tests on glass slides are conducted via the test tube dilution method adopted from the procedure recommended by the American Phytopathological Society's committee on standardization of fungicidal tests. In this procedure, the product of Example I in aqueous formulations at concentrations of 1000, 100, 10 and 1.0 p.p.m. is tested for its ability to inhibit germination of spores of from 7- to 10-day old cultures of *Alternaria oleracea* and *Monilinia fructicola*. These concentrations refer to initial concentrations before diluting four volumes with one volume of spore stimulant and spore suspension. Germination records are taken after 20 hours of incubation at 22° C. by counting 100 spores. Results indicate that concentrations of 100 to 1000 p.p.m. afford disease control for both *A. oleracea* and *M. fructicola*.

EXAMPLE III

A tomato foliage disease test is conducted measuring the ability of the product of Example I to protect tomato foliage against infection by the early blight fungus *Alternaria solani*. Tomato plants 5 to 7 inches high of the variety Bonny Best are employed. The plants are sprayed with 100 ml. of test formulation at 2000 p.p.m. and 400 p.p.m. (2000 and 400 p.p.m. product of Example I—5% acetone—0.01% Triton X-155—balance water) at 40 lbs. air pressure while being rotated on a turntable in a spray chamber. After the spray deposit is dry, the treated plants and comparable untreated controls are sprayed with a spore suspension containing approximately 20,000 conidia of *A. solani* per ml. The plants are held in a 100% humid atmosphere for 24 hours at 70° F. to permit spore germination and infection. After two to four days, lesion counts are made on the three uppermost fully expanded leaves. Data based on the number of lesions obtained on the control plant shows greater than 97% disease control at the above concentrations.

EXAMPLE IV

Fungicidal utility is also demonstrated by the ability of the test compound to protect tomato plants against the late blight fungus, *Phytophthora infestans*. The method employs tomato plants 5 to 7 inches high of the variety Bonny Best. 100 ml. of a test formulation (2000 p.p.m. and 400 p.p.m. product of Example I—5% acetone—0.01% Triton X-155—balance water) are sprayed on the plants at 40 lbs. air pressure while the plants are being rotated on a turntable in a spray chamber. After the spray deposit is dry, the treated plants and comparable untreated controls are sprayed with approximately 150,000 sporangia of *P. infestans* per ml. The plants are held in a 100% humid atmosphere for 24 hours at 60° F. to permit spore germination and infection. After two to four days, lesion counts are made on the three uppermost fully expanded leaves. Comparing the number of lesions on the test plants and control plants shows disease control of greater than 65% on the test plants at both of the above concentrations.

EXAMPLE V

In order further to demonstrate fungicidal activity of the product of Example I, tomato plants, variety Bonny Best, growing in 4-inch pots are treated by pouring a test formulation (2000 p.p.m. product of Example I—5% acetone—0.01% Triton X-155—balance water) onto the soil in the pots at a rate equivalent to 128 lbs./acre (102 mg./pot). Tomato plants, 3 to 4 inches tall, at time of treatment, are sprayed with a spore suspension of the early blight fungus. 10 to 14 days following treatment observation indicates 65% disease control, indicating systemic fungicidal activity for the product of Example I.

EXAMPLE VI

To show nematocidal activity of the product of Example I, composted greenhouse soil in one-half gallon glazed crocks is infested with 3–5 g. of knotted or galled tomato roots containing the root knot nematode, Meloidogyne. Treatment at a rate equivalent to 128 lbs./acre in a primary test (770 mg./crock) is effected by mixing the test chemical intimately with the soil. Tomato plants, as indicator crop, are planted in the crocks 4 to 7 days after treatment and the degree of knotting or galling is used as an index of the nematocidal activity of the test material. A rating system of 0 for no injury to 10 for severe infestation comparable to controls is used. Using the product of Example I results indicate the control plants receive a rating of 9.8 whereas the tested plants receive a rating of 0.3, thus demonstrating a high degree of nematocidal activity.

EXAMPLE VII

Further fungicidal activity is demonstrated employing the large seed leaves of 10-day-old pinto bean plants. The product of Example I is applied to the soil in a test formulation (2000 p.p.m. product of Example I—5% acetone—0.01% Triton X-155—balance water). The concentration of test chemical used is equivalent to 128 lbs./acre. Immediately following application of the test chemical to the soil surrounding the plants, the plants are sprayed with a spore suspension of the rust fungus, *Uromyces phaseoli*. This spore suspension is prepared by taking 30 mg. of freshly harvested spores and mixing with 48 mg. of talc. This is then diluted with water at the rate of about 1 mg. of the talc spore mixture to 1.7 ml. of water.

After spraying the spores on the seed leaves of the bean plants, they are placed in a 100% humid atmosphere for 24 hours at 60° F. The plants are then removed to controlled greenhouse conditions and 9–10 days after exposure rust lesions are counted. The data observed are converted to percentage disease control based on the number of lesions found on the control plants. Using this procedure, results indicate greater than 65% disease control.

EXAMPLE VIII

*Preparation of Tetrakis(2-Hydroxyethylthio)Ethylene*

500 ml. of isopropanol and 56.1 g. of potassium hydroxide are added to a flask equipped with stirrer, thermometer, and reflux condenser. 80.0 g. of 2-mercapto ethanol is then added to this mixture with stirring followed by the addition of 41.5 g. of perchloroethylene. The mixture is then heated to reflux, i.e., about 82° C., for about 64 hours. Upon reaction completion, the desired product is purified by recystallization from isopropanol yielding the desired $C_{10}H_{20}O_4S_4$ melting at 116°–117° C. The identity of the desired tetrakis(2-hydroxyethylthio)ethylene is indicated by the following elemental analytical data:

| Element | Actual, Percent By Wt. | Calculated, Percent By Wt. |
|---|---|---|
| C | 36.2 | 36.2 |
| H | 6.1 | 6.1 |

This product dissolves in water, acetone, cyclohexanone, and xylene to the extent of less than 5 g. per 100 ml. and to the extent of more than 5 g. per 100 ml. of methanol at 25° C.

EXAMPLE IX

*Preparation of 1-Chloro-1,2,2-Tris-(Isopropylthio) Ethylene*

500 ml. of isopropanol and 66 g. (1.0 mol) of 86% potassium hydroxide are placed in a flask equipped with a thermometer, reflux condenser, and stirrer. 84 g. (1.1 mols) of iso propyl mercaptan is then added to the mixture followed by the addition of 41.5 g. (0.25 mol) of perchloroethylene. The mixture is refluxed for about 120 hours, and then another 16.7 g. (0.22 mol) of isopropyl mercaptan is added and refluxing continued for an additional 48 hours. The resultant product is purified by filtering of potassium chloride and distilling the desired 1-chloro-1,2,2-tris-(isopropylthio)ethylene at 95° to 102° C. at 0.3 mm. Hg pressure. The desired product, $C_{11}H_{21}S_3Cl$, is indicated by the following elemental analytical data:

| Element | Actual, Percent By Wt. | Calculated, Percent By Wt. |
|---|---|---|
| H | 7.5 | 7.4 |

EXAMPLE X

In order to demonstrate insecticidal activity of the product of Example IX, fourth instar larvae of the Mexican bean beetle, *Epilachna varivestis*, less than one day old within the instar, are employed. Paired seed leaves, excised from Tendergreen bean plants, are dipped into a formulation of the test compound (2000 p.p.m. product of Example IX—5% acetone—0.01% Triton X-155—balance water) until they are thoroughly wetted. The chemical deposit on the leaf is then dried and the paired leaves are separated. Each is placed in a 9 cm. Petri dish with a filter paper liner, and ten randomly selected larvae are introduced before the dish is closed. After three days' exposure, greater than 80% insect mortality is observed and greater than 50% insect feeding inhibition occurs.

EXAMPLE XI

In order to make an in vitro evaluation of the product of Example IX as a contact nematocide, nematodes (*Panagrellus redivivus*) are exposed to the product of Example IX in small watch glasses (27 mm. diameter x 8 mm. deep) within a 9 cm. Petri dish. Aqueous test formulations (1000 and 100 p.p.m. product of Example IX—5% acetone—0.01% Triton X-155—balance water) are used. Results are recorded 24 hours after treatment and 100% nematode control at both of the above concentrations is observed.

EXAMPLE XII

*Preparation of Tetrakis(2-Chloroethylthio)Ethylene*

21.0 g. (0.176 mol) of thionyl chloride is dissolved in 25.0 ml. of chloroform to which 10.8 g. (0.032 mol) of tetrakis-(2-hydroxyethylthio)ethylene dissolved in 175 ml. of chloroform is added slowly. Hydrogen chloride is given off rapidly and upon completion of addition, the mixture is refluxed for three hours. The desired solid is then separated from the reaction mixture by filtering and recrystallizing from chloroform yielding the desired $C_{10}H_{16}S_4Cl_4$ melting at 140°–141° C. The identity of tetrakis(2-chloroethylethio)ethylene is indicated by the following elemental analytical data:

| Element | Actual, Percent By Wt. | Calculated, Percent By Wt. |
|---|---|---|
| C | 29.3 | 29.6 |
| H | 4.2 | 4.0 |

EXAMPLE XIII

The product of Example XII affords greater than 50% insect mortality and greater than 50% insect feeding inhibition at a concentration of 2000 p.p.m. in the test employed in Example X.

EXAMPLE XIV

Fungicidal activity of the product of Example XII is demonstrated employing the procedure given in Example IV previously. This test indicates that the product of Example XII causes greater than 96% blight control at cencentrations of 2000 and 400 p.p.m.

EXAMPLE XV

The product of Example XII at a concentration of 2000 p.p.m. causes greater than 50% fungus control using the test given in Example V.

EXAMPLE XVI

*Preparation of 1,2-Dichloro-1,2-Bis-(Isopropylsulfonyl)Ethylene*

28.0 g. (0.114 mol) of 1,2-dichloro-1,2-bis(2-propylthio)ethylene is dissolved in 170 ml. of a 1:1 mixture of acetic acid and acetic anhydride. This mixture is then cooled to about 8° C. and 85.5 g. of 20.0% $H_2O_2$ is added dropwise with stirring at a temperature below 25° C. The reactants are stirred at 5° to 35° C. for 65 hours. The product is then recrystallized from methanol yielding the desired 1,2-dichloro-1,2-bis(isopropylsulfonyl) ethylene, $C_8H_{14}O_4S_2Cl_2$, melting at 137.0°–137.5° C. Its identity is indicated by the following elemental analytical data:

| Element | Actual, Percent By Wt. | Calculated, Percent By Wt. |
|---|---|---|
| C | 31.2 | 31.1 |
| H | 4.4 | 4.6 |
| Cl | 22.2 | 22.9 |

EXAMPLE XVII

Insecticidal activity of the product of Example XVI is demonstrated employing the procedure given in Example X. In this test, the product of Example XVI causes greater than 80% insect mortality and greater than 50% insect feeding inhibition.

EXAMPLE XVIII

Fungicidal activity is demonstrated employing the spore germination test given in Example II previously. In this test the product of Example XVI is effective at concentrations of less than 1 p.p.m. for both the *A. oleracea* and *M. fructicola*, respectively, thus indicating a very high degree of fungicidal activity.

EXAMPLE XIX

Further fungicidal utility is demonstrated employing the product of Example XVI in the fungicidal test given in Example III previously. In this test at concentrations of 2000 and 400 p.p.m. early blight control of greater than 99% is observed.

EXAMPLE XX

The product of Example XVI in the fungicidal test given in Example IV causes greater than 95% control of late blight concentrations of 2000 and 400 p.p.m.

EXAMPLE XXI

The following test measures the ability of the product of Example XVI to protect pea seed and seedlings from seed decay and damping off fungi (Pythium and Fusarium). In this test infested soil in 4 x 4 x 3-inch plant band boxes is treated by a soil drench-mix method at the equivalent rate of 128 lbs./acre. Treatment is accomplished by pouring 70 ml. of a 2000 p.p.m. test formulation (2000 p.p.m. product of Example XVI–5% acetone—0.01% Triton X–155) on the surface of the soil. This is allowed to stand until the next day when the soil is removed from each box and thoroughly mixed before being replaced in the box. Three days after treatment, 25 pea seeds, variety Perfection, are planted to a uniform depth per box. Untreated checks and standardized material are included in each test in addition to a check planted in sterilized soil. Observation after 14 days indicates the product of Example XVI in this fungicidal test causes greater than 95% fungus control at a concentration of 2000 p.p.m.

EXAMPLE XXII

Systemic fungicidal activity is demonstrated employing the procedure given in Example V. In this test the product of Example XVI causes greater than 85% disease control.

EXAMPLE XXIII

To evaluate bactericidal activity, the product of Example XVI is mixed with distilled water containing 5% acetone and 0.01% Triton X–155, at a concentration of 500 p.p.m. Five milliliters of the test formulation is placed in each of four test tubes. To each test tube is added one of the organisms: *Erwinia amylovora*, *Xanthomonas phaseoli*, *Staphylococcus aureus*, and *Escherichia coli* in the form of a bacterial suspension in a saline solution from potato-dextrose agar plates. The tubes are then incubated for four hours at 30° C. Transfers are then made to sterile broth with a standard 4 mm. loop and the thus-inoculated broth is incubated for 48 hours at 37° C., when growth is rated as percent bacteria growth. Using this procedure, the product of Example XVI causes 100% control of bacteria for the *X. phaseoli* and *S. aureus*, but has relatively no effect on the *E. amylovora* or *E. coli*, thus demonstrating selective anti-bacterial activity.

EXAMPLE XXIV

Seeds of perennial rye grass and radish are treated in Petri dishes with aqueous suspensions of the test chemical at 1000 and 100 p.p.m. (1000 or 100 p.p.m. product of Example XVI—5% acetone—0.01% Triton X–155—balance water). Lots of 25 seeds of each type are scattered in separate dishes containing filter paper discs moistened with 5 ml. of the test formulation at each concentration. After 7 to 10 days under controlled conditions the test compound is given a rating which corresponds to the concentration that inhibits germination of at least half of the seeds (ED 50) in the test. Using this test, the product of Example XVI is effective at concentrations of 10 to 100 p.p.m. for the radish and 100 to 1000 p.p.m. for the rye grass, thus indicating selective herbicidal activity.

EXAMPLE XXV 17.7 g. (0.0436 mol) of tetrakis(2-chloroethylthio)ethylene is suspended in 400 ml. of acetic acid. 45.0 g. of 31.6% hydrogen peroxide is added at a temperature of 45° to 54° C. over a 15-minute period. The reaction mixture is heated at 70°–80° C. for a period of about 1.5 hours. Upon cooling and removing a major proportion of the solvent through distillation at reduced pressure, the product, including tetrakis(2-chloroethylsulfonyl)ethylene and 1-(2-chloroethylsulfinyl)-1,1,2-tris-(2-chloroethylsulfonyl)ethylene, precipitates and is purified by recrystallization from methanol. The purified product melts at 113° to 114° C.

EXAMPLE XXVI

Fungicidal activity of the product of Example XXV is indicated employing the procedure given in Example II previously. In this test, the product of Example XXV is effective at concentrations of 10 to 100 p.p.m. for both the *A. oleracea* and *M. fructicola*.

EXAMPLE XXVII

Further fungicidal utility is demonstrated employing the product of Example XXV in the test procedure given in Example III. In this test at a concentration of 400 p.p.m. the product of Example XXV causes greater than 95% blight control.

EXAMPLE XXVIII

The product of Example XXV causes greater than 85% blight control at a concentration of 400 p.p.m. employing the procedure given in Example IV previously.

EXAMPLE XXIX

The product of Example XXV affords greater than 85% fungus control in the test given in Example XXI.

EXAMPLE XXX

Employing the herbicidal evaluation given in Example XXIV, the product of Example XXV is effective at concentrations of 100 to 1000 p.p.m. for both the radish and rye grass species.

EXAMPLE XXXI

To detect root absorption and translocation, tomato plants, variety Bonny Best, 5 to 7 inches tall, and bean plants, variety Tendergreen, are treated by pouring 51 ml. of a 2000 p.p.m. aqueous test formulation (2000 p.p.m. product of Example XXV—5% acetone—0.01% Triton X-155—balance water) onto the soil of 4-inch pots (102 mg./pot or approximately equivalent to 128 lbs./acre) in which the plants are growing. Plants are held under controlled greenhouse conditions for at least ten days before examination after which phytotoxicity ratings are given based on a scale from 0 for no injury to 11 for plant kill. Using this procedure the product of Example XXV receives a rating of 11 for the tomato plants and 0 for the bean plants, indicating selective herbicidal activity.

EXAMPLE XXXII

Employing the nematocidal evaluation procedure given in Example XI, the product of Example XXV affords 100% control at a concentration of 1000 p.p.m.

It is to be understood that although the invention has been described with specific reference to particular embodiments thereof, it is not to be so limited since changes and alterations therein may be made which are within the full intended scope of this invention as defined by the appended claims.

What is claimed is:
1. Tetrakis-(2-hydroxyethylthio)ethylene.
2. 1-chloro-1,2,2-tris(isopropylthio)ethylene.
3. Tetrakis(2-chloroethylthio)ethylene.
4. Tetrakis(2-chloroethylsulfonyl)ethylene.
5. 1 - (2 - chloroethylsulfinyl) - 1,2,2 - (2 - chloroethylsulfonyl)ethylene.
6. The method of preparing 1,2-dichloro-1,2-bis-(2-propylthio)ethylene which comprises chemically reacting 2-propyl mercaptan and tetrachloroethylene.
7. The method of preparing tetrakis(2-hydroxyethylthio)ethylene which comprises chemically reacting 2-mercaptoethanol and tetrachloroethylene.
8. The method of preparing 1-chloro-1,2,2-tris-(isopropylthio)ethylene which comprises chemically reacting isoproyl mercaptan and tetrachloroethylene.
9. The method of preparing tetrakis(2-chloroethylthio)-ethylene which comprises chemically reacting tetrakis(2-hydroxyethylthio)ethylene and thionylchloride.
10. The method of preparing 1,2-dichloro-1,2-bis-(isopropylsulfonyl)ethylene which comprises chemically reacting 1,2-dichloro-1,2-bis(isopropylthio)ethylene with an oxidizing agent.
11. The methtod of preparing tetrakis(2-chloroethylsulfonyl)ethylene which comprises chemically reacting tetrakis-(2-chloroethylthio)ethylene with an oxidizing agent.
12. Compounds represented by the structure:

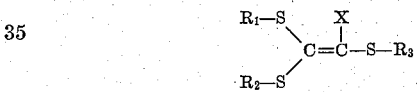

wherein $R_1$, $R_2$, and $R_3$ are each alkyl groups and X is halogen selected from the group consisting of fluorine, chlorine and bromine.

References Cited in the file of this patent

UNITED STATES PATENTS

| | | |
|---|---|---|
| 1,986,218 | Remy | Jan. 1, 1935 |
| 2,493,364 | Schoene | Jan. 3, 1950 |
| 2,676,129 | Bashour | Apr. 20, 1954 |
| 2,677,617 | Thompson | May 4, 1954 |
| 2,793,234 | Metivier | May 21, 1957 |
| 2,802,035 | Fincke | Aug. 6, 1957 |
| 2,877,153 | Webb | Mar. 10, 1959 |
| 2,893,911 | Raasch | July 7, 1959 |

OTHER REFERENCES

Schneider: Ber. Deut. Chem., 84, 911–916 (1951).
Boehm et al. Liebig's Annalen, 587, 51–62 (1954).